US006968289B1

(12) United States Patent
Tsuchiya et al.

(10) Patent No.: US 6,968,289 B1
(45) Date of Patent: Nov. 22, 2005

(54) METHOD OF PREDICTING DISPLACEMENT RANGE OF WIRE HARNESS, PREDICTING DEVICE AND PREDICTING PROGRAM

(75) Inventors: Shinji Tsuchiya, Kosai (JP); Takeshi Hasegawa, Kosai (JP); Satoshi Shimada, Hamamatsu (JP)

(73) Assignee: Yazaki Corporation, Tokyo (JP)

( * ) Notice: Subject to any disclaimer, the term of this patent is extended or adjusted under 35 U.S.C. 154(b) by 44 days.

(21) Appl. No.: 10/656,264

(22) Filed: Sep. 8, 2003

(30) Foreign Application Priority Data

Sep. 9, 2002 (JP) ........................... P2002-262706
Aug. 4, 2003 (JP) ........................... P2003-286237

(51) Int. Cl.[7] ................................................ H02G 3/18

(52) U.S. Cl. ...................................................... 702/155

(58) Field of Search .................... 702/155, 42; 73/812, 73/808, 810, 814, 815, 849, 853; 385/69, 385/135, 134, 68; 174/70, 128, 65, 260; 350/96, 350/23; 700/98; 606/74, 200; 148/568; 433/29; 29/33; 52/19; 349/150; 211/106; 600/152, 600/549; 5/246; 351/110; 181/166

(56) References Cited

U.S. PATENT DOCUMENTS

| | | | | |
|---|---|---|---|---|
| 4,657,343 | A * | 4/1987 | Oldham et al. | 385/69 |
| 6,439,059 | B1 * | 8/2002 | Inoue et al. | 73/812 |
| 2002/0100601 | A1 * | 8/2002 | Arthur et al. | 174/65 G |

FOREIGN PATENT DOCUMENTS

| | | | |
|---|---|---|---|
| DE | 199 35 422 | A | 2/2001 |
| EP | 1 209 035 | A2 | 5/2002 |
| FR | 2 778 280 | A | 11/1999 |
| JP | 2001-251740 | A | 9/2001 |

* cited by examiner

*Primary Examiner*—Michael Nghiem
*Assistant Examiner*—Tung Lau
(74) *Attorney, Agent, or Firm*—Sughrue Mion, PLLC

(57) ABSTRACT

A method of predicting a displacement range of a wire harness, includes the steps of: designing a basic route of the wire harness; fixing the wire harness at least two different fixing points on the basic route; computing a displacement range of the wire harness between the fixing points, based on a length of the basic route between the fixing points including a dimensional tolerance, fixing positions and fixing directions of the wire harness at the fixing points, and a minimum bending radius of the wire harness; and displaying the displacement range of the wire harness in three dimensions.

8 Claims, 8 Drawing Sheets

METHOD OF PREDICTING DISPLACEMENT RANGE OF WIRE HARNESS, PREDICTING DEVICE AND PREDICTING PROGRAM

BACKGROUND OF THE INVENTION

The present invention relates to a method device and a predicting program for predicting a range of displacements of a wire harness which are caused by dimensional tolerances, fixing ways and the like for highly precisely designing a route of a wire harness arranged on a vehicle or the like.

Normally, various electric devices are mounted on a vehicle. Those electric devices are connected by use of a wire structure, called a wire harness, which is a bundle of electric wires and communication wires bundled with insulation locking bands, tape bands or the like. The wire harness is usually designed allowing for shapes of door, body and the like of the vehicle onto which the wire harness is arranged, presence of electric parts, layout of the wire harness on the wire harness assembling tool plate, and others.

The wire harness thus route-designed and mounted at predetermined locations sometimes suffers from accidental problems after the wire harness is mounted. As well known, the wire harness has specific length, diameter, weight, elasticity, rigidity and the like, and hence, has material properties similar to those of an elastic member. Fixing positions and fixing directions of the wire harness by fixing members, such as clamps, are not uniform, and dimensional tolerances in the design stage are also present.

For this reason, after the wire harness is mounted, the wire harness actually displaces or shifts from a designed arrangement within a certain range by the action of gravity, engine driving operation, vibration when the vehicle runs, and others. By such arrangement displacements of the wire harness, the wire harness will come in contact with portions or electric devices, which are not anticipated in the design stage. This results in problems of damage and the like. To avoid the problems, more precise wire harness route design is required.

SUMMARY OF THE INVENTION

It is therefore an object of the present invention to provide a predicting method, a predicting device and a predicting program which are capable of highly precisely designing routes of a wire harness without using complicated computations, by predicting a range of the arrangement displacement.

In order to achieve the above object, according to the present invention, there is provided a method of predicting a displacement range of a wire harness, comprising the steps of:

designing a basic route of the wire harness;

fixing the wire harness at least two different fixing points on the basic route;

computing a displacement range of the wire harness between the fixing points, based on a length of the basic route between the fixing points including a dimensional tolerance, fixing positions and fixing directions of the wire harness at the fixing points, and a minimum bending radius of the wire harness; and displaying the displacement range of the wire harness in three dimensions.

In the displacement predicting method, a displacement range computing step compute the displacement range of the wire harness between two fixing members by using the length of the pre-designed basic route, the fixing positions and fixing directions by the two fixing members, and the minimum bending radius. The displacement range is three dimensionally displayed. Accordingly, a designer can intuitively and exactly judge as to whether or not the basic route is proper. Therefore, the displacement predicting method enables a designer to highly precisely design a route of a wire harness for a short time. The designer can make a practical prediction of the displacement range without complicated computations by utilizing the minimum bending radius.

Preferably, the computing step includes the steps of: computing two predictive routes which satisfy the length of the basic route, the fixing positions, the fixing directions and the minimum bending radius, and the two predictive routes being respectively closest to the fixing points; obtaining a plurality of computing points for computing the displacement range based on the predictive routes; and computing outermost points of a plurality of predictive routes which satisfy the route length, the fixing positions, the fixing directions and the minimum bending radius, at each of the plurality of computing points. The display step includes the steps of: successively connecting the outermost points, which are close to each other; and displaying the displacement range as lines connecting the outermost points.

The computing points for computing displacement range by using the two predictive routes closest to the two fixing members, are obtained. The outermost points of those predictive routes are computed at each of the computing points. The outermost points close to each other are successively connected and displayed. Thus, the predictive displacement range is displayed like a bird cage. Accordingly, the display of it is excellent in visual confirmation property. Therefore, the designer can more exactly judge as to whether or not the designed basic route is proper, and make a more precise route design of the wire harness.

Preferably, the method further comprising the steps of: combining the computed displacement range with at least one of a shape of a fixing portion and an interposition object; and displaying the combined image in three dimensions.

In the embodiment, the predictive displacement range and a configuration of the mounting portion are compositely displayed. This composite image enables a designer to design a more practical route design of the wire harness.

Preferably, the wire harness is arranged on a door or a body of a vehicle.

The embodiment enables the designer to make a route design, which eliminates such an unwanted situation that the door and the body of the vehicle adversely affect the wire harness as the result of vibration proper to the vehicle. In other words, this feature enables the designer to make a highly precise route design of the wire harness of the vehicle.

According to the present invention, there is also provided a displacement range predicting device for predicting a displacement range of a pre-designed basic route of a wire harness, comprising:

an input unit, inputting a length of the basic route including a dimensional tolerance, fixing positions and fixing directions of the wire harness on at least two different fixing points where the wire harness is fixed by fixing members, and a minimum bending radius of the wire harness;

a displacement range computing unit, computing the displacement range of the wire harness between the fixing members, based on the length of the basic route, the fixing positions, the fixing directions and the minimum bending radius; and a display unit, displaying the displacement range in three dimensions.

The thus constructed displacement predicting device computes the displacement range of the wire harness between the two fixing members by using the parameters as input, such as the basic route length, the fixing positions and the fixing directions, and the minimum bending radius. The computed displacement range is three dimensionally displayed. Accordingly, the designer can properly and easily judge as to whether or not the basic route is proper. Therefore, the displacement predicting method enables a designer to highly precisely design a route of a wire harness for a short time. Further, the designer can make a practical prediction of a displacement of the wire harness without complicated computations by utilizing the minimum bending radius.

According to the present invention, there is also provided a predicting program for executing a method of predicting a displacement range of a wire harness used in a computer, said program comprising the steps of:

designing a basic route of the wire harness which is fixed at least two different fixing points on the basic route;

computing a displacement range of the wire harness between the fixing points, based on a length of the basic route between the fixing points including a dimensional tolerance, fixing positions and fixing directions of the wire harness at the fixing points, and a minimum bending radius of the wire harness; and displaying the displacement range of the wire harness in three dimensions.

Preferably, the computing step includes the steps of:

computing two predictive routes which satisfy the length of the basic route, the fixing positions, the fixing directions and the minimum bending radius, and the two predictive routes being respectively closest to the fixing points;

obtaining a plurality of computing points for computing the displacement range based on the predictive routes; and computing outermost points of a plurality of predictive routes which satisfy the route length, the fixing positions, the fixing directions and the minimum bending radius, at each of the plurality of computing points. The display step includes the steps of: successively connecting the outermost points, which are close to each other; and displaying the displacement range as lines connecting the outermost points.

Preferably, the predicting program, further comprising the steps of: combining the computed displacement range with at least one of a shape of a fixing portion and an interposition object; and displaying the combined image in three dimensions.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
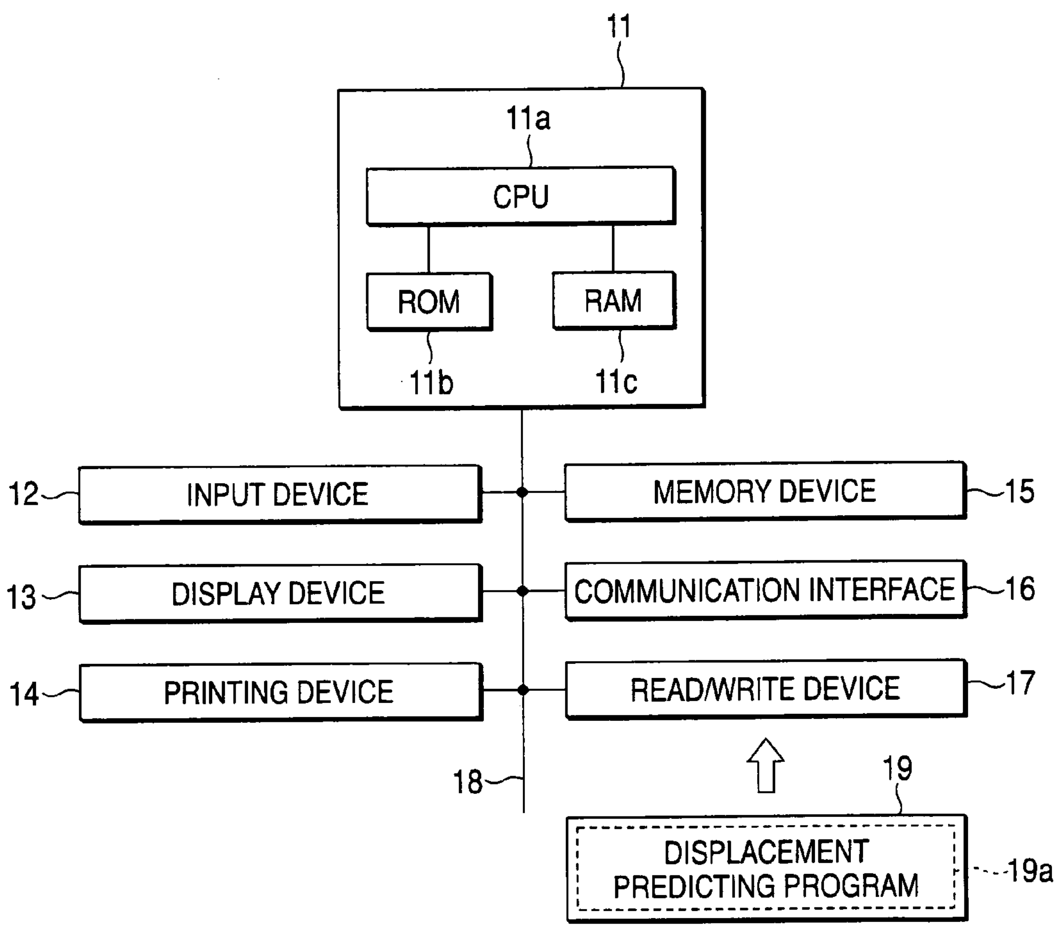
FIG. 1 is a block diagram showing a hardware configuration to implement the invention.

The preferred embodiments of the present invention will be described with reference to the accompanying drawings. A hardware arrangement to implement a displacement predicting method according to an embodiment of the invention, will first be described with reference to FIG. 1. FIG. 1 is a block diagram showing a hardware configuration to implement the invention.

As shown in FIG. 1, the present embodiment uses a computer, for example, a personal computer, which includes a microcomputer 11, an input device 12, a display device 13, a printing device 14, a memory device 15, and a communication interface 16. The microcomputer 11 includes a CPU (central processing unit) 11*a*, a ROM 11*b* for storing a boot program and others, and a RAM 11*c* for temporarily storing various operation results. The input device 12 as input unit may be a keyboard, a computer mouse and the like for inputting related values and others to the computer. The display device 13 is a LCD (Liquid Crystal Display) and a CRT (Cathode-Ray Tube) or the like for visually displaying processing results. The printing device 14 is a printer for printing the processing results on a recording medium. The memory device 15 may be a hard disc drive storing a displacement predicting program 19*a* and the processing results processed by the displacement predicting program 19*a*. The communication interface 16 may be a modem board for performing data communication with external devices by use of a LAN network and a internet network. A read/write device 17 reads the displacement predicting program 19*a* stored in a CD-ROM and a DVD-ROM or the like, and writes the processing results processed by the displacement predicting program 19*a* to a recording medium 19. Those components are interconnected through an internal bus 18.

The microcomputer 11 installs the displacement predicting program 19*a* which is read by the read/write device 17 to the memory device 15. Also, after a power is turned on, the microcomputer 11 is booted up according to a boot program stored in the ROM 11*b* so that the installed displacement predicting program 19*a* is activated. The microcomputer 11 performs displacement predicting processes in accordance with the displacement predicting program 19*a*. Also, the results of the processes are output to the display device 13 and the printing device 14 or stored in the memory device 15 and the recording medium 19 under an operation of the microcomputer 11. The displacement predicting program 19*a* can be installed in the a personal computer or the like having the above mentioned components. After installing to the personal computer, the personal computer is served as a displacement predicting device for predicting a range of displacements of a wire harness. The displacement predicting program 19*a* may be installed via a communication network such as the internet network and the LAN network as well as the recording medium 19.

Figure 2:
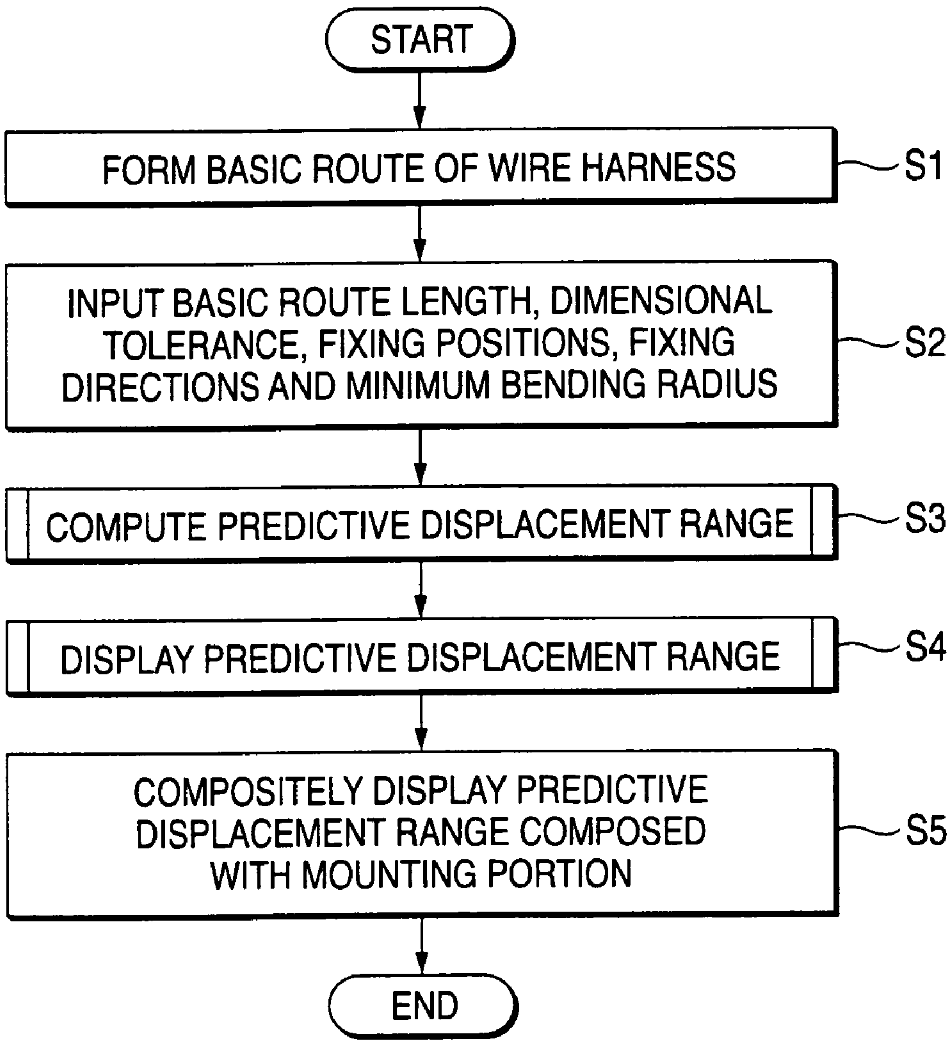
FIG. 2 is a flow chart showing a basic processing procedure of the displacement predicting method of the invention.
Figure 3A:
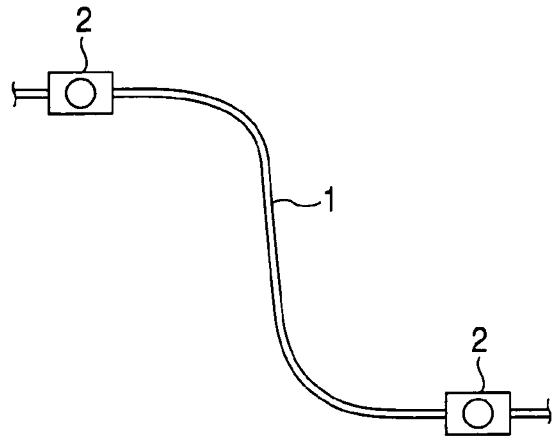
FIG. 3A is a diagram showing a basic route of a wire harness.
Figure 3B:
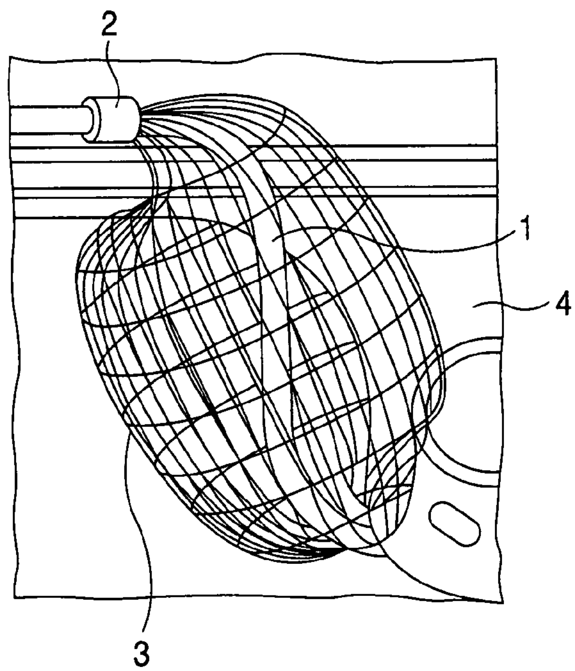
FIGS. 3B and 3C are diagrams exemplarily showing displays of the processing results output from the computer when it executes the predicting method.
Figure 3C:
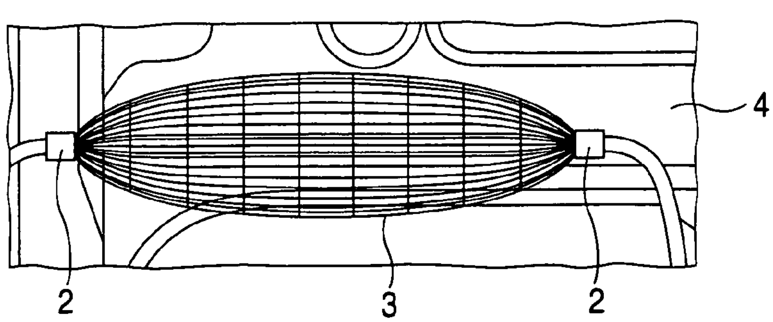

A processing procedure of the displacement predicting method will be described with reference to FIG. 2 through FIG. 8. A basic processing procedure of the displacement predicting method will be described with reference to FIGS. 2 and 3. FIG. 2 is a flow chart showing a basic processing procedure of the displacement predicting method of the invention. FIG. 3A is a diagram showing a basic route of a wire harness, and FIGS. 3B and 3C are diagrams exemplarily showing displays of the processing results output from the computer when it executes the predicting method.

In a step S1 in FIG. 2, a basic route 1 of a wire harness is designed by considering shapes of door, body and the like of the vehicle onto which the wire harness is arranged, presence of electric parts, layout of the wire harness on the assembling tool plate, and others. The basic route 1 is formed by fixing at least two points of the wire harness by fixing members 2, as shown in FIG. 3A. Fixing positions and fixing directions of the wire harness are determined by the fixing members 2. The fixing member 2 may be a connector, a rotary clamp or a mounting clamp. In the embodiment, the fixing clamps (or connectors) are used for the fixing members 2. Data representative of the basic route 1 thus designed is stored in the memory device 15 before the subsequent processings will be carried out. A range of displacements of the basic route 1 of the wire harness is predicted by the subsequent processing procedures.

In the next step S2, parameters on the basic route 1, i.e., a basic route length, a dimensional tolerance, fixing positions, fixing directions, and a minimum bending radius, are input to the computer by use of the input device 12. A basic route length is a length of the basic route 1 between the two fixing members 2. A dimensional tolerance is a maximum value of tolerance values that the basic route length normally has. For example, when the basic route length is 20 mm, the dimensional tolerance is about ±5 mm. The fixing position and the fixing direction of the wire harness are depend on a fixing to the wire harness by the fixing member 2. A minimum bending radius, called also a limit bending radius, is one of material properties of the wire harness to be predicted. A value of the minimum bending radius may be obtained in advance by a test. Those parameters are input to the micro computer 11 by use of the input device 12.

In a step S3, the micro computer 11 computes a range of a predictive displacement of the basic route 1 by using the data on the basic route 1 stored in the memory device 15, and the input parameters. In a step S4, the computed predictive displacement range is displayed on a screen of the display device 13, or is printed out on a recording medium by the printing device 14. The processing procedures of the steps S3 and S4 will be described in detail later on with reference to FIGS. 4 and 7. If required, in a step S5, the predictive displacement range may be displayed by combing with fixing portions and objects to be in contact with the wire harness, and the combined image may be displayed in three-dimensionally. For example, as shown in FIGS. 3B and 3C, a predictive displacement range 3 is combined with a mounting portion 4, and in the combined image, the predictive displacement range is displayed like a bird cage which extends along the basic route 1, while expanding around the basic route. Thus, the predictive displacement range and a configuration of the mounting portion 4 are compositely displayed. As a result, the composite image enables a user to design a more practical route design of the wire harness. The step S3 is equivalent to a displacement range computing step or displacement range computing unit, and the step 4 is equivalent to displacement range display unit. Further, the step S5 is equivalent to a composite display step.

Figure 4:
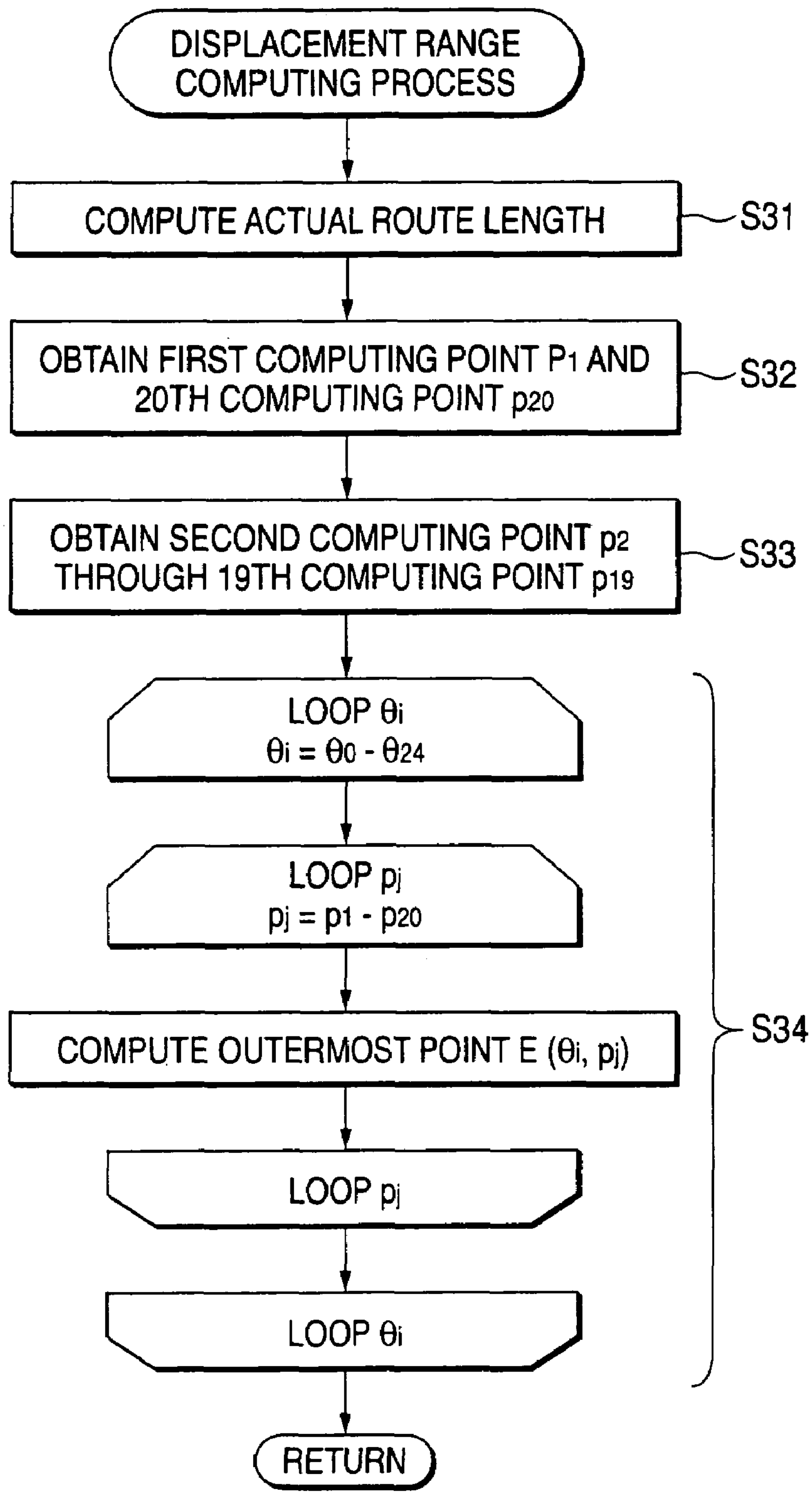
FIG. 4 is a flow chart showing a process of computing a predictive displacement range of FIG. 2.

A method of computing a predictive displacement range will be described with reference to FIGS. 4 to 6. FIG. 4 is a flow chart showing a process of computing a predictive displacement range of FIG. 2. FIG. 5 is a diagram useful in explaining a procedure of the predictive displacement range computing process of FIG. 4. FIGS. 6A and 6B are diagrams useful in explaining pitch angles used in the predictive displacement range computing process. The process of computing the predictive displacement range is carried out by the CPU 11*a* of the micro computer 11.

Figure 5A:
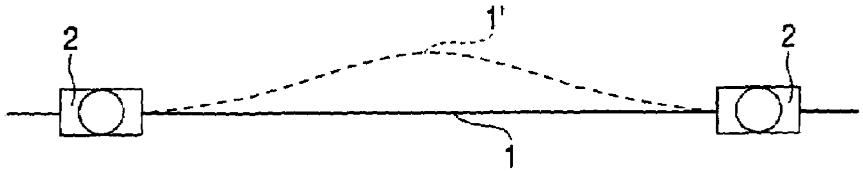
FIG. 5A–5D are diagrams useful in explaining a procedure of the predictive displacement range computing process of FIG. 4.
Figure 6A:
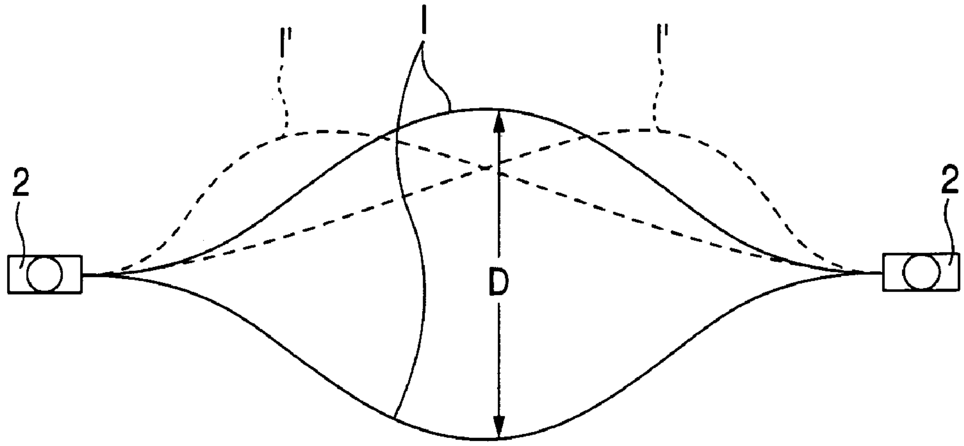
FIGS. 6A and 6B are diagrams useful in explaining pitch angles used in the predictive displacement range computing process.
Figure 6B:
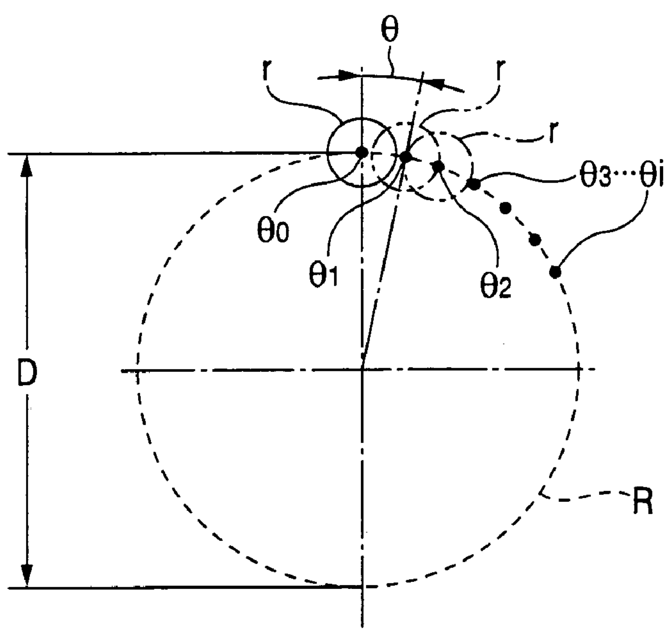

In a step S31 of FIG. 4, the CPU of the micro computer computes a length of an actual route 1' of the wire harness indicated by a dotted line in FIG. 5A. The actual route 1' is a route having a length (actual route length) of the sum of a length of the basic route 1 and an absolute value of the dimensional tolerance.

Figure 5B:
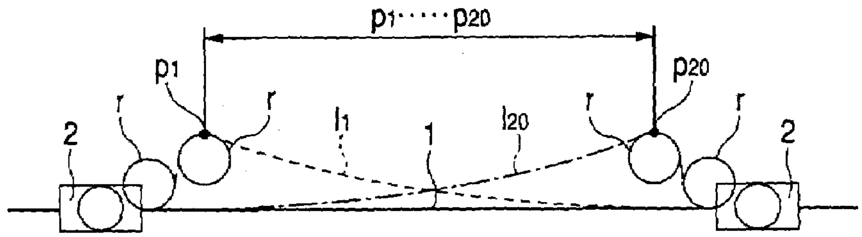

In a step S32, the CPU computes a first computing point $P_1$ and a 20th computing point $P_{20}$ based on the actual route length and the minimum bending radius, as shown in FIG. 5B. The first computing point $P_1$ and the 20th computing point $P_{20}$ are, respectively, a start point and an end point for computations to be described later, viz., those points are reference points of these sorts. The first computing point $P_1$ and the 20th computing point $P_{20}$ are at peak points of predictive routes of the actual route 1' satisfying the minimum bending radius, in particular predictive routes $I_1$ and $I_{20}$ which satisfy the minimum bending radius at two points. In the figure, reference letter "r" indicates a circle defined by the minimum bending radius of the wire harness, which is to be computed. In computing the first computing point $P_1$ and the 20th computing point $P_{20}$, the wire harness route sometimes contains at least two inflection points, as shown in FIG. 5B.

In a step S33, the CPU computes from second computing point $P_2$ to 19th computing point. $P_{19}$ by using the first computing point $P_1$ and the 20th computing point $P_{20}$. Those computing points $P_2$ through $P_{19}$ are set at points obtained by equally dividing a length between the first computing point $P_1$ and the 20th computing point $P_{20}$. In this way, the computing points $P_1$ to $P_{20}$ may be obtained by the steps S31 and S32. Those computing points may be those as obtained in another method. Incidentally, the computing points $P_2$ through $P_{19}$ are not limited to the equally divided points. In other words, the computing points may be any discrete points if those are relatively dispersed on the route of the wire harness. The steps S32 and S33 is equivalent to a computing point acquiring step.

Then, in a step S34, outermost points E ($\theta_i$, $P_j$) are computed. A pitch angle β used when the outermost points are computed will first be described with reference to FIG. 6. The pitch angle β is an angle for three-dimensionally and uniformly assigning the computing points $P_1$ to $P_{20}$ to around the route of the wire harness to be computed. Two routes "I" of the wire harness between the fixing members 2 to be computed, which are in equilibrium in a state that no force is applied to them, are obtained as shown in FIG. 6A. A virtual circle R whose diameter D is equal to a distance between the most outer points of those two actual routes "I" is obtained. Reference letter "I" designates other routes to be computed which satisfy the minimum bending radius. Then, a center of a circle "r" is positioned on a circumference of the virtual circle R, as shown in FIG. 6B. Subsequently, another circle "r" is centered at a point where the circle "r" intersects the virtual circle R. An angle defined by those two circles "r" and the center of the virtual circle R is a pitch angle β. The pitch angle β is within 15°. A point where one pitch angle β intersects the virtual circle. R is $\theta_1$, a point where two pitch angles intersects the virtual circle R is $\theta_2$, and points $\theta_{23}, \ldots, \theta_i$ are obtained in similar manners. A reference point is $\theta_0$. In this instance, $\theta_0$ to $\theta_{24}$ are assigned to the circumference of the virtual circle. Another assignment of the points can be used, if necessary. Essentially, those points may be a plurality of points which are three-dimensionally and uniformly assigned to the computing points to around the route of the wire harness to be computed.

Figure 5C:
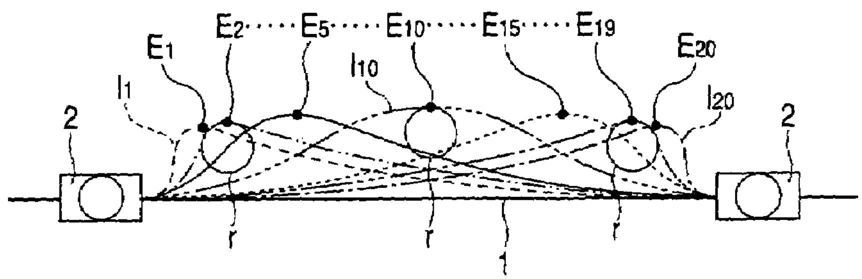
Figure 5D:
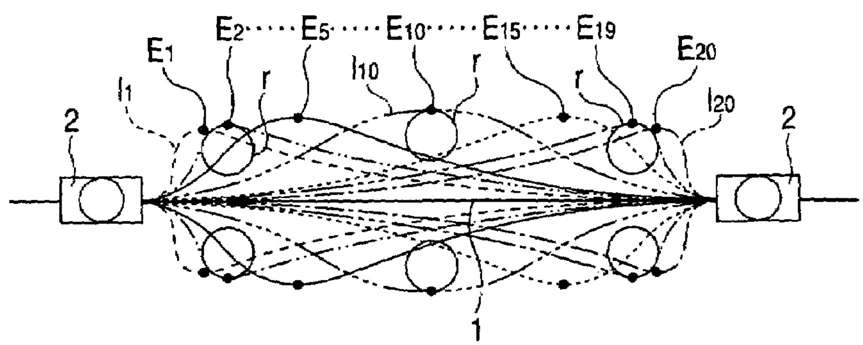

To start with, as shown in FIG. 5C, the outermost points $E(\theta_0, P_1), \ldots E(\theta_0, P_{21})$, corresponding to the computing points $P_1$ to $P_{20}$ at the point $\theta_0$ are obtained. The outermost points $E(\theta_i, P_j)$ at the points $\theta_1$ to $\theta_{24}$ are successively obtained as shown in FIG. 5D. In FIG. 5, the outermost points $E(\theta_0, P_1), \ldots E(\theta_0, P_{20})$ are expressed symbolically as $E_1, \ldots, E_{20}$. The outermost points are set at peak points on respective routes $I_1, \ldots, I_{10}, \ldots, I_{20}$. In this way, all the outermost points corresponding to all computing points $P_1$ to $P_{20}$ at all angles $\theta_0$ to $\theta_{24}$ are computed. The step S34 is equivalent to an outermost point computing step.

Figure 7:
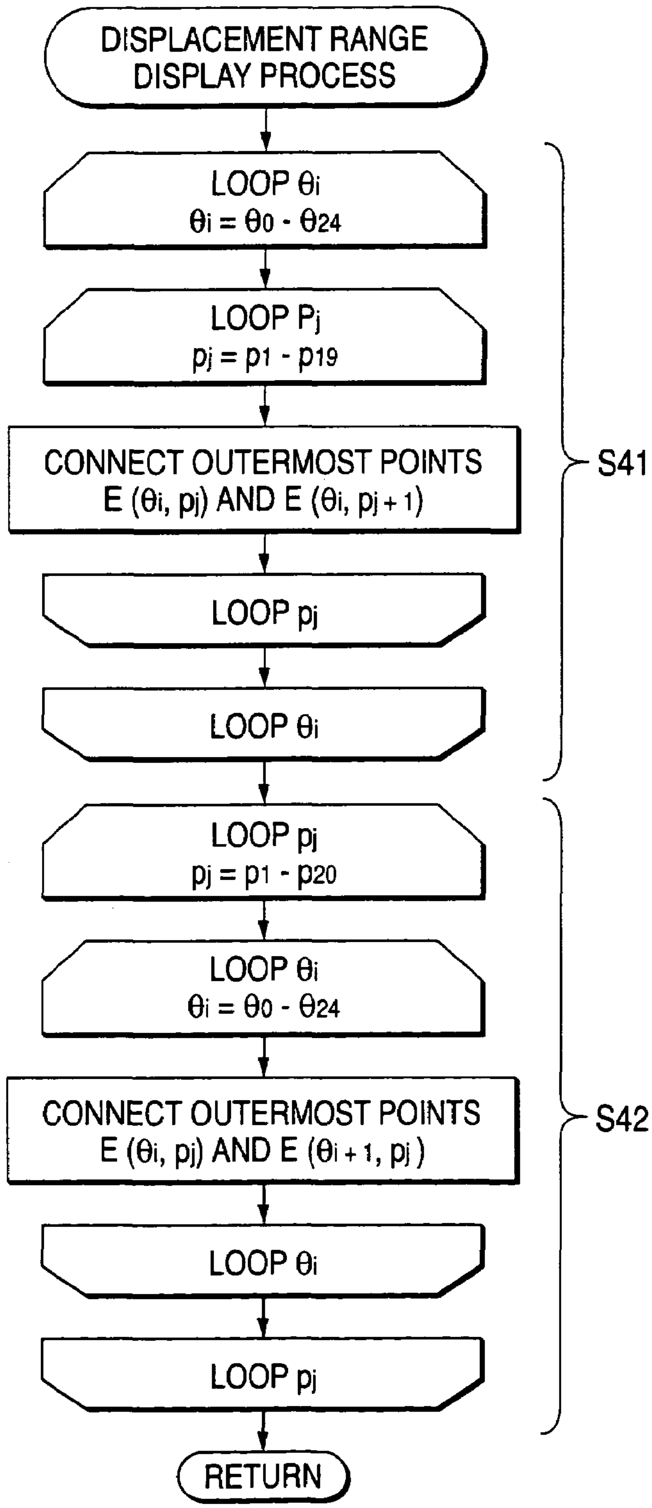
FIG. 7 is a flow chart showing a sequence of procedural steps of a predictive displacement range display process shown in FIG. 2.

A method of displaying a predictive displacement range will be described with reference to FIGS. 7 and 8. FIG. 7 is a flow chart showing a sequence of procedural steps of a predictive displacement range display process. FIG. 8 is a diagram useful in explaining a process of executing the predictive displacement range displaying process shown in FIG. 7.

Figure 8A:
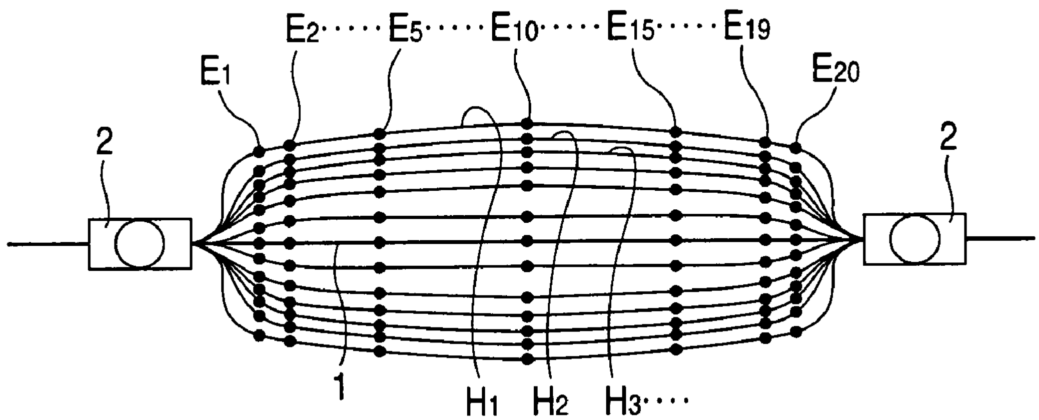
FIGS. 8A and 8B are diagrams useful in explaining a process of executing the predictive displacement range displaying process shown in FIG. 1.
Figure 8B:
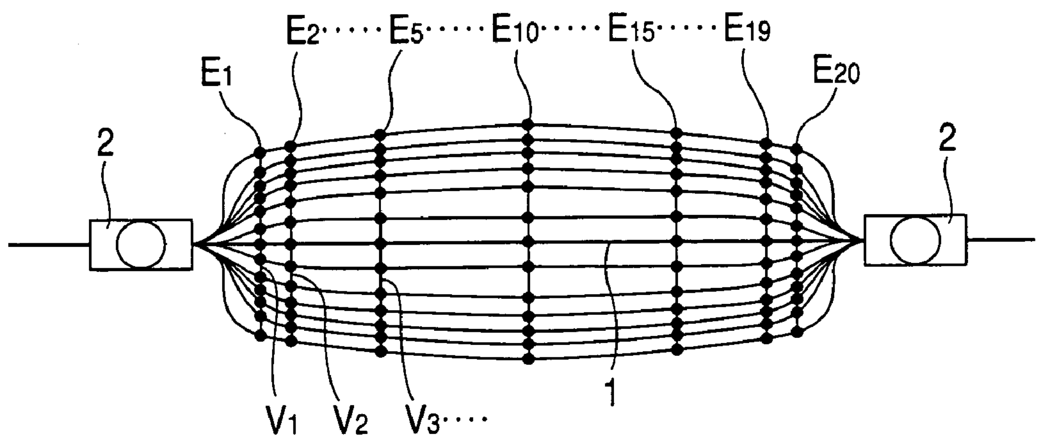

In step S41 in FIG. 7, as indicated by $H_1, H_2, H_3, \ldots$ in FIG. 8A, the adjacent outermost points $E(\theta_i P_j)$ and $E(\theta_i, P_{j+1})$ are successively connected at each of the points $\theta_0$ to $\theta_{24}$. The outermost points $E_1$ and $E_{20}$ and the fixing members 2 are connected by utilizing the parts of the routes when the first computing point and the 20th computing point were obtained. Then, in a step S42, as indicated by $V_1, V_2, V_3, \ldots$ in FIG. 8B, the adjacent outermost points $E(\theta_i, P_j)$ and $E(\theta_{i+1}, P_j)$ are successively connected at each of the computing points $P_1$ to $P_{20}$. In this way, the adjacent outermost points $E(\theta_i, \theta_j)$ are connected, and finally a predictive displacement range is displayed having a shape of a narrow bird cage. Thus, the predictive displacement range is displayed like the bird cage. Accordingly, the display of the predictive displacement range is excellent in visual confirmation property. Also, the user can exactly judge whether or not a designed basic route is proper, thus realizing a precise route design of the wire harness. It is a matter of course that the procedural flow of each of the steps S41 and S42 may be reversed in order. It is not limited to successively connect all of the outermost points $E(\theta_i, P_j)$. For example, those outermost points may be connected every other outermost point. Such a connection of the outermost points enables the designer to roughly grasp the predictive displacement range. The steps S41 to S42 are equivalent to a connection display step.

The predictive displacement range may be displayed such that it is composed with the mounting portion on the route of the wire harness, and the composite image is displayed as shown in FIG. 3C.

As described above, in the embodiments, the predicting method and the predicting device are capable of more precisely designing the route of the wire harness by predicting a displacement range without complicated computations by utilizing the minimum bending radius. In particular, the method and device more effectively operate when those are applied to the route design of the wire harness of the vehicle.

The displacement range predicting method and device of the invention may be applied to the wire harness laid within a building or the like. The computing points and the pitch angles exemplarily described in the embodiment may be changed. The displacement predicting results are not only displayed and printed by the display device 13 and the printing device 14, but also transferred to external devices by way of communication interface 16 and the LAN network. It should be understood that the invention is not limited to the embodiment mentioned above, but may variously be modified, altered, and changed within the true spirits and scope of the invention.

What is claimed is:

1. A method of predicting a displacement range of a wire harness, comprising the steps of:

designing a basic route of the wire harness;

fixing the wire harness at least two different fixing points on the basic route;

computing a displacement range of the wire harness between the fixing points, based on values of a length of the basic route between the fixing points including a dimensional tolerance, fixing positions and fixing directions of the wire harness at the fixing points, and a minimum bending radius of the wire harness, the computing step including the steps of:

computing two predictive routes which satisfy the values of the length of the basic route, the fixing positions, the fixing directions and the minimum bending radius, and the two predictive routes being respectively closest to the fixing points;

obtaining a plurality of computing points for computing the displacement range based on the predictive routes; and computing outermost points of a plurality of predictive routes which satisfy the values of the route length, the fixing positions, the fixing directions and the minimum bending radius, at each of the plurality of computing points; and displaying the displacement range of the wire harness in three dimensions by using the outermost points.

2. The method as set forth in claim 1, wherein the display step includes the steps of:

successively connecting the outermost points, which are close to each other; and displaying the displacement range as lines connecting the outermost points.

3. The method as set forth in claim 1, further comprising the steps of:

combining the computed displacement range with at least one of a shape of a fixing portion and an interposition object; and displaying the combined image in three dimensions.

4. The method as set forth in claim 1, wherein the wire harness is arranged on a door or a body of a vehicle.

5. A predicting device for predicting a displacement range of a pre-designed basic route of a wire harness, comprising:

an input unit, inputting values of a length of the basic route including a dimensional tolerance, fixing positions and fixing directions of the wire harness on at least two different fixing points where the wire harness is fixed by fixing members, and a minimum bending radius of the wire harness;

a displacement range computing unit, computing the displacement range of the wire harness between the fixing members, based on the values of the length of the basic route, the fixing positions, the fixing directions and the minimum bending radius, the displacement range computing unit that computes two predictive routes which satisfy the values of the length of the basic route, the fixing positions, the fixing directions and the minimum bending radius, and the two predictive routes being respectively closest to the fixing points, the displacement range computing unit that obtains a plurality of computing points for computing the displacement range based on the predictive routes, and the displacement range computing unit that computes outermost points of a plurality of predictive routes which satisfy the values of the route length, the fixing positions, the fixing directions and the minimum bending radius at each of the plurality of computing points; and a display unit, displaying the displacement range in three dimensions by using the outermost points.

6. A predicting program for executing a method of predicting a displacement range of a wire harness used in a computer, said program comprising the steps of:

designing a basic route of the wire harness which is fixed at least two different fixing points on the basic route;

computing a displacement range of the wire harness between the fixing points, based on values of a length of the basic route between the fixing points including a dimensional tolerance, fixing positions and fixing directions of the wire harness at the fixing points, and a minimum bending radius of the wire harness, the computing step including the steps of:

computing two predictive routes which satisfy the values of the length of the basic route, the fixing positions, the fixing directions and the minimum bending radius, and the two predictive routes being respectively closest to the fixing points;

obtaining a plurality of computing points for computing the displacement range based on the predictive routes; and computing outermost points of a plurality of predictive routes which satisfy the values of the route length, the fixing positions, the fixing directions and the minimum bending radius, at each of the plurality of computing points; and displaying the displacement range of the wire harness in three dimensions by using the outermost points.

7. The predicting program as set forth in claim 6, wherein the display step includes the steps of:

successively connecting the outermost points, which are close to each other; and displaying the displacement range as lines connecting the outermost points.

8. The predicting program as set forth in claim 6, further comprising the steps of:

combining the computed displacement range with at least one of a shape of a fixing portion and an interposition object; and displaying the combined image in three dimensions.

* * * * *